United States Patent
Barbour

(10) Patent No.: US 9,239,000 B2
(45) Date of Patent: Jan. 19, 2016

(54) METHOD TO PROVIDE POWER GAIN IN AN ENGINE

(75) Inventor: Robert H. Barbour, Ashbourne (GB)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 13/696,397

(22) PCT Filed: May 23, 2011

(86) PCT No.: PCT/US2011/037491
§ 371 (c)(1),
(2), (4) Date: Mar. 5, 2013

(87) PCT Pub. No.: WO2011/149799
PCT Pub. Date: Dec. 1, 2011

(65) Prior Publication Data
US 2013/0233267 A1    Sep. 12, 2013

Related U.S. Application Data

(60) Provisional application No. 61/347,869, filed on May 25, 2010.

(51) Int. Cl.
| | | |
|---|---|---|
| *F02B 43/00* | (2006.01) | |
| *F02B 43/02* | (2006.01) | |
| *C10L 1/222* | (2006.01) | |
| *C10L 1/2383* | (2006.01) | |
| *C10L 10/02* | (2006.01) | |
| *C10L 10/18* | (2006.01) | |

(52) U.S. Cl.
CPC .............. *F02B 43/02* (2013.01); *C10L 1/2222* (2013.01); *C10L 1/2383* (2013.01); *C10L 10/02* (2013.01); *C10L 10/18* (2013.01)

(58) Field of Classification Search
CPC ................... C10M 2215/04; C10M 2207/027; C10M 2207/028; C10M 2215/26; C10L 1/10; C10L 2270/023; C10L 2200/0423; C10L 2270/026; F02B 43/02
USPC ........... 44/422, 321, 335, 404, 419, 425, 242, 44/255, 387, 391, 415; 548/545; 123/1 A
See application file for complete search history.

(56) References Cited

U.S. PATENT DOCUMENTS

| | | | | |
|---|---|---|---|---|
| 3,991,079 A * | 11/1976 | Hoke | ......................... | C08F 8/32 548/967 |
| 4,564,372 A | 1/1986 | Campbell | | |
| 4,600,409 A * | 7/1986 | Campbell | ............ | C10L 1/2225 252/392 |
| 5,254,138 A | 10/1993 | Kurek | | |
| 5,752,990 A * | 5/1998 | Siskin | ..................... | C10L 1/143 44/418 |
| 2007/0142238 A1* | 6/2007 | Katafuchi | ............ | C10M 133/00 508/192 |
| 2008/0307698 A1* | 12/2008 | Barton | ...................... | C08F 8/32 44/321 |
| 2010/0024286 A1* | 2/2010 | Smith | ..................... | C10L 10/08 44/404 |
| 2010/0281760 A1* | 11/2010 | Reid | ......................... | C10L 1/22 44/321 |
| 2010/0293844 A1* | 11/2010 | MacMillan | ............. | C10L 1/221 44/419 |
| 2010/0299992 A1* | 12/2010 | Reid | ......................... | C10L 1/22 44/425 |
| 2011/0185626 A1* | 8/2011 | Barton | .................. | C10L 1/2383 44/353 |
| 2012/0138004 A1* | 6/2012 | Stevenson | ............. | C10L 1/2222 123/1 A |
| 2013/0104826 A1* | 5/2013 | Burgess | ................ | C10L 1/2383 123/1 A |

FOREIGN PATENT DOCUMENTS

| | | |
|---|---|---|
| WO | 2006/135881 A2 | 12/2006 |
| WO | 2009/040583 A1 | 4/2009 |
| WO | 2009/040584 A1 | 4/2009 |
| WO | 2009/040585 A1 | 4/2009 |
| WO | 2010/097624 A1 | 9/2010 |
| WO | 2010/132259 A1 | 11/2010 |
| WO | WO 2010132259 A1 * | 11/2010 |
| WO | 2010/150040 A1 | 12/2010 |

OTHER PUBLICATIONS

English translation of AR081385A1, see "AR081385A1.pdf", dated Aug. 29, 2012.*
Corresponding International Publication No. WO2011/149799 A1 & Search Report published Dec. 1, 2011.
Written Opinion from corresponding International Application No. PCT/US2011/037491.

* cited by examiner

*Primary Examiner* — Lindsay Low
*Assistant Examiner* — Long T Tran
(74) *Attorney, Agent, or Firm* — Iken S. Sans; Christopher D. Hilker; Teresan W. Gilbert

(57) ABSTRACT

The present invention provides fuel compositions containing specific additives quaternary ammonium salts or combination of additives as well as methods of operating internal combustion engines using such fuel compositions, resulting in a power gain in the engines.

12 Claims, No Drawings

METHOD TO PROVIDE POWER GAIN IN AN ENGINE

FIELD OF THE INVENTION

The present invention provides fuel compositions containing specific additives or combination of additives as well as methods of operating internal combustion engines using such fuel compositions, resulting in a power gain in the engines.

BACKGROUND

Dwindling petroleum reserves and deterioration in air quality caused by automotive emissions have resulted in massive efforts to improve internal combustion engine performance. The basic problem is that the internal combustion engine is inherently inefficient. Only a small fraction of the fuel that it burns is actually converted into useful power. The remainder is dissipated in the form of heat or vibration, or consumed in overcoming friction between the engine's many moving parts. Some of the fuel that enters the combustion chamber is not completely burned, and passes out the tailpipe as hydrocarbons (HC), carbon monoxide (CO), and other combustion byproducts, many of which are major components of air pollution or "smog". In view of the millions of automobiles and other fuel-powered vehicles and engines operating in the world, it is evident that even a miniscule improvement in engine efficiency could result in substantial savings of petroleum and significant reductions in air pollution.

There is therefore a need for improved engine performance. Ideally such improvement could be achieved by using a specific fuel composition or adding a specific additive or combination of additives to a fuel composition, and then supplying the fuel composition to an engine. Such an approach would be attractive as it would avoid the need for costly equipment modifications often needed to improve engine performance.

SUMMARY

The present invention provides a method for fueling an internal combustion engine that includes the step of supplying to the engine a fuel composition. The fuel composition includes a fuel that is liquid at room temperature and a quaternary ammonium salt. The quaternary ammonium salt includes a reaction product of (a) the reaction product of a hydrocarbyl substituted acylating agent and a compound having an oxygen or nitrogen atom capable of condensing with said acylating agent and further having a tertiary amino group and (b) a quaternizing agent suitable for converting the tertiary amino group to a quaternary nitrogen.

In some embodiments the quaternary ammonium salt is present at 50 ppm or higher in the fuel composition supplied to the engine.

In some embodiments the methods of the present invention result in the engine experiencing a power gain of at least 0.5 kW, measured at maximum engine power, compared to the engine's operation with the fuel of component (i) without the additive of component (ii).

The present invention further provides for the use of a quaternary ammonium salts as a power gain additive in an internal combustion engine, and more specifically, the use of a quaternary ammonium salts as a power gain additive in a fuel composition that is utilized in an internal combustion engine.

The present invention also provides fuel compositions that include a fuel that is liquid at room temperature and a quaternary ammonium salt. The quaternary ammonium salt includes a reaction product of (a) the reaction product of a hydrocarbyl substituted acylating agent and a compound having an oxygen or nitrogen atom capable of condensing with said acylating agent and further having a tertiary amino group and (b) a quaternizing agent suitable for converting the tertiary amino group to a quaternary nitrogen.

The present invention also includes the use of quaternized polyester salts which comprise the reaction product of (a) a polyester containing a tertiary amino group and (b) a quaternizing agent suitable for converting the tertiary amino group to a quaternary nitrogen, wherein the quaternizing agent is selected from the group consisting of dialkyl sulfates, benzyl halides, hydrocarbyl substituted carbonates, hydrocarbyl epoxides in combination with an acid or mixtures thereof.

In other words the invention provides a method of providing a gain in power during the operation of an internal combustion comprising: supplying to said engine a fuel composition comprising: (i) a fuel which is liquid at room temperature; and (ii) a quaternary ammonium salt comprising the reaction product of a compound containing a tertiary amino group and a quaternizing agent suitable for converting the tertiary amino group to a quaternary nitrogen. The compound containing a tertiary amino group may include: (i) the reaction product of a hydrocarbyl substituted acylating agent and a compound having an oxygen or nitrogen atom capable of condensing with said acylating agent and further having a tertiary amino group; or (ii) a polyester reaction product of a fatty carboxylic acid containing at least one hydroxyl group and a compound having an oxygen or nitrogen atom capable of condensing with said acid and further having a tertiary amino group.

Any of these described quaternary ammonium salt may be used as power gain additives in fuel compositions and/or the internal combustion engines in which the fuels are used.

DETAILED DESCRIPTION

Various preferred features and embodiments will be described below by way of non-limiting illustration.

This invention, involves the use of a fuel composition that includes the quaternary ammonium salt and a method of operating an internal combustion engine with the fuel composition. The compositions and methods of the present invention minimize, reduce and control deposit formation in the engine, which reduces fuel consumption, promotes drivability, vehicle maintenance, and reduces emissions which enables optimal engine operation. The compositions and methods of the present invention also result in a power gain in the engines in which they are used.

The Fuel

Fuels suitable for use in the present invention are not overly limited. Generally, suitable fuels are normally liquid at ambient conditions e.g., room temperature (20 to 30° C.). The liquid fuel can be a hydrocarbon fuel, a non-hydrocarbon fuel, or a mixture thereof.

The hydrocarbon fuel can be a petroleum distillate, including a gasoline as defined by ASTM specification D4814, or a diesel fuel, as defined by ASTM specification D975. In one embodiment the liquid fuel is a gasoline, and in another embodiment the liquid fuel is a non-leaded gasoline. In another embodiment the liquid fuel is a diesel fuel. The hydrocarbon fuel can be a hydrocarbon prepared by a gas to liquid process to include for example hydrocarbons prepared by a process such as the Fischer-Tropsch process. In some embodiments, the fuel used in the present invention is a diesel fuel, a biodiesel fuel, or combinations thereof.

The non-hydrocarbon fuel can be an oxygen containing composition, often referred to as an oxygenate, which includes an alcohol, an ether, a ketone, an ester of a carboxylic acid, a nitroalkane, or a mixture thereof. The non-hydrocarbon fuel can include for example methanol, ethanol, methyl t-butyl ether, methyl ethyl ketone, transesterified oils and/or fats from plants and animals such as rapeseed methyl ester and soybean methyl ester, and nitromethane.

Mixtures of hydrocarbon and non-hydrocarbon fuels can include, for example, gasoline and methanol and/or ethanol, diesel fuel and ethanol, and diesel fuel and a transesterified plant oil such as rapeseed methyl ester and other bio-derived fuels. In one embodiment the liquid fuel is an emulsion of water in a hydrocarbon fuel, a non-hydrocarbon fuel, or a mixture thereof. In several embodiments of this invention the liquid fuel can have a sulphur content on a weight basis that is 5000 ppm or less 1000 ppm or less, 300 ppm or less, 200 ppm or less, 30 ppm or less, or 10 ppm or less.

The liquid fuel of the invention is present in a fuel composition in a major amount that is generally greater than 95% by weight, and in other embodiments is present at greater than 97% by weight, greater than 99.5% by weight, or greater than 99.9% by weight.

The Quaternary Ammonium Salt

The quaternary salt comprises the reaction product of (a) the condensation product of a hydrocarbyl-substituted acylating agent and a compound having an oxygen or nitrogen atom capable of condensing with said acylating agent and said condensation product further having a tertiary amino group and (b) a quaternizing agent suitable for converting the tertiary amino group of compound (a) to a quaternary nitrogen. In some embodiments the quaternizing agent includes dialkyl sulfates, benzyl halides, hydrocarbyl substituted carbonates; hydrocarbyl epoxides or mixtures thereof. In some embodiments the quaternizing agent is used in combination with an acid, for example, in some embodiments the hydrocarbyl epoxide is used in combination with an acid.

The hydrocarbyl substituted acylating agent of the invention is the reaction product of a long chain hydrocarbon, generally a polyolefin substituted with a monounsaturated carboxylic acid reactant such as (i) α,β-monounsaturated $C_4$ to $C_{10}$ dicarboxylic acid such as fumaric acid, itaconic acid, maleic acid.; (ii) derivatives of (i) such as anhydrides or $C_1$ to $C_5$ alcohol derived mono- or di-esters of (i); (iii) α,β-monounsaturated $C_3$ to $C_{10}$ monocarboxylic acid such as acrylic acid and methacrylic acid.; or (iv) derivatives of (iii) such as $C_1$ to $C_5$ alcohol derived esters of (iii) with any compound containing an olefinic bond represented by the general formula:

$$(R^1)(R^1)C=C(R^1)(CH(R^1)(R^1)) \quad (I)$$

wherein each $R^1$ is independently hydrogen or a hydrocarbyl group.

Olefin polymers for reaction with the monounsaturated carboxylic acids can include polymers comprising a major molar amount of $C_2$ to $C_{20}$, e.g. $C_2$ to $C_5$ monoolefin. Such olefins include ethylene, propylene, butylene, isobutylene, pentene, octene-1, or styrene. The polymers can be homopolymers such as polyisobutylene, as well as copolymers of two or more of such olefins such as copolymers of; ethylene and propylene; butylene and isobutylene; propylene and isobutylene. Other copolymers include those in which a minor molar amount of the copolymer monomers e.g., 1 to 10 mole % is a $C_4$ to $C_{18}$ diolefin, e.g., a copolymer of isobutylene and butadiene; or a copolymer of ethylene, propylene and 1,4-hexadiene.

In one embodiment, at least one R of formula (I) is derived from polybutene, that is, polymers of C4 olefins, including 1-butene, 2-butene and isobutylene. C4 polymers can include polyisobutylene. In another embodiment, at least one R of formula (I) is derived from ethylene-alpha olefin polymers, including ethylene-propylene-diene polymers. Ethylene-alpha olefin copolymers and ethylene-lower olefin-diene terpolymers are described in numerous patent documents, including European patent publication EP 0 279 863 and the following U.S. Pat. Nos. 3,598,738; 4,026,809; 4,032,700; 4,137,185; 4,156,061; 4,320,019; 4,357,250; 4,658,078; 4,668,834; 4,937,299; 5,324,800 each of which are incorporated herein by reference for relevant disclosures of these ethylene based polymers.

In another embodiment, the olefinic bonds of formula (I) are predominantly vinylidene groups, represented by the following formulas:

$$-(H)C=C(R^2)(R^2 \quad (II)$$

wherein $R^2$ is a hydrocarbyl group, and $$-(H)(R^3)C(C(CH_3)=CH2) \quad (III)$$

wherein $R^3$ is a hydrocarbyl group.

In one embodiment, the vinylidene content of formula (I) can comprise at least about 30 mole % vinylidene groups, at least about 50 mole % vinylidene groups, or at least about 70 mole % vinylidene groups. Such material and methods for preparing them are described in U.S. Pat. Nos. 5,071,919; 5,137,978; 5,137,980; 5,286,823, 5,408,018, 6,562,913. 6,683,138, 7,037,999 and U.S. Publication Nos. 20040176552A1, 20050137363 and 20060079652A1, which are expressly incorporated herein by reference, such products are commercially available by BASF, under the tradename GLISSOPAL® and by Texas Petrochemicals LP, under the tradename TPC 1105™ and TPC 595™.

Methods of making hydrocarbyl substituted acylating agents from the reaction of the monounsaturated carboxylic acid reactant and the compound of formula (I) are well know in the art and disclosed in the following patents: U.S. Pat. Nos. 3,361,673 and 3,401,118 to cause a thermal "ene" reaction to take place; U.S. Pat. Nos. 3,087,436; 3,172,892; 3,272,746, 3,215,707; 3,231,587; 3,912,764; 4,110,349; 4,234,435; 6,077,909; 6,165,235 and are hereby incorporated by reference.

In another embodiment, the hydrocarbyl substituted acylating agent can be made from the reaction of at least one carboxylic reactant represented by the following formulas:

$$(R^4C(O)(R^5)_nC(O))R^4 \quad (IV)$$

and

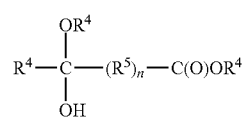
(V)

wherein each $R^4$ is independently H or a hydrocarbyl group, and each $R^5$ is a divalent hydrocarbylene group and n is 0 or 1 with any compound containing an olefin bond as represented by formula (I). Compounds and the processes for making these compounds are disclosed in U.S. Pat. Nos. 5,739,356;

5,777,142; 5,786,490; 5,856,524; 6,020,500; and 6,114,547 hereby incorporated by reference.

In some embodiments the hydrocarbyl substituted acylating agent may be a polyisobutylene succinic acid and/or anhydride; a polyhydroxy carboxylic acid such as polyhydroxystearic acid or polyricinoleic acid.

Other methods of making the hydrocarbyl substituted acylating agent can be found in the following reference, U.S. Pat. Nos. 5,912,213; 5,851,966; and 5,885,944 which are hereby incorporated by reference.

The compound having an oxygen or nitrogen atom capable of condensing with the acylating agent and further having a tertiary amino group can be represented by the following formulas:

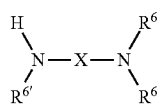
(VI)

wherein X is a alkylene group containing about 1 to about 4 carbon atoms; and wherein each $R^6$ is independently a hydrocarbyl group, and $R^6$ can be hydrogen or a hydrocarbyl group.

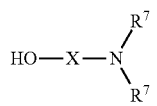
(VII)

wherein X is a alkylene group containing about 1 to about 4 carbon atoms; and wherein each $R^7$ is independently a hydrocarbyl group.

Examples of the nitrogen or oxygen contain compounds capable of condensing with the acylating agent and further having a tertiary amino group can include but are not limited to: dimethylaminopropylamine, N,N-dimethylaminopropylamine, N,N-diethyl-aminopropylamine, N,N-dimethylaminoethylamine or mixtures thereof. In addition, nitrogen or oxygen contain compounds which may be alkylated to contain a tertiary amino group may also used. Examples of the nitrogen or oxygen contain compounds capable of condensing with the acylating agent after being alkylated to having a tertiary amino group can include but are not limited to: ethylenediamine, 1,2-propylenediamine, 1,3-propylene diamine, the isomeric butylenediamines, pentanediamines, hexanediamines, heptanediamines, diethylenetriamine, dipropylenetriamine, dibutylenetriamine, triethylenetetraamine, tetraethylenepentaamine, pentaethylenehexaamine, hexamethylenetetramine, and bis(hexamethylene) triamine, the diaminobenzenes, the diaminopyridines or mixtures thereof.

The nitrogen or oxygen containing compounds capable of condensing with the acylating agent and further having a tertiary amino group can further include aminoalkyl substituted heterocyclic compounds such as 1-(3-aminopropyl)imidazole and 4-(3-aminopropyl)morpholine, 1-(2-amino-ethyl) piperidine, 3,3-diamino-N-methyldipropylamine, 3'3-aminobis (N,N-dimethylpropylamine). Another type of nitrogen or oxygen containing compounds capable of condensing with the acylating agent and having a tertiary amino group include alkanolamines including but not limited to triethanolamine, N,N-dimethylaminopropanol, N,N-diethylaminopropanol, N,N-diethylaminobutanol, N,N,N-tris(hydroxyethyl)amine, or mixtures thereof.

In some embodiments the condensation product of the hydrocarbyl substituted acylating agent and the compound having an oxygen or nitrogen atom capable of condensing with said acylating agent is the condensation product of a hydrocarbyl substituted acylating agent and a polyamine, and more specifically an alkylene polyamine. As noted above, suitable hydrocarbyl substituted acylating agents include polyolefin substituted succinic acids and anhydrides such as polyisobutylene substituted succinic acids and anhydrides, and polyhydroxy carboxylic acids such as polyhydroxystearic acid and polyricinoleic acid. Suitable polyamines include any of those described above including dimethylaminopropylamine.

The composition of the present invention contains a quaternizing agent suitable for converting the tertiary amino group to a quaternary nitrogen wherein the quaternizing agent is selected from the group consisting of dialkyl sulfates, alkyl halides, hydrocarbyl substituted carbonates; hydrocarbyl epoxides and mixtures thereof. The quaternizing agents may be used in combination with an acid, for example, the hydrocarbyl epoxides may be used in combination with an acid, In one embodiment the quaternizing agent can include halides, such as chloride, iodide or bromide; hydroxides; sulphonates; alkyl sulphates, such as dimethyl sulphate; sultones; phosphates; C1-12 alkylphosphates; di C1-12 alkylphosphates; borates; C1-12 alkylborates; nitrites; nitrates; carbonates; bicarbonates; alkanoates; O,O-di-C1-12 alkyldithiophosphates; or mixtures thereof.

In one embodiment, alkylation of primary amines and secondary amines or mixtures with tertiary amines may be exhaustively or partially alkylated to a tertiary amine and further alkylated to a quaternary salt all in one step. In this one step, it is necessary to properly account for the hydrogens on the nitrogens and provide base or acid as required (e.g., alkylation up to the tertiary amine requires removal (neutralization) of the hydrogen (proton) from the product of the alkylation). With alkylating agents, such as, alkyl halides or dialkyl sulfates, the product of alkylation of a primary or secondary amine is a protonated salt and needs a source of base to free the amine and to proceed to the quaternary salt with these such agents requires alkylation of the tertiary amine, and the product is the quaternary ammonium halide or monomethyl sulfate. In contrast, epoxides as alkylating agents do both the alkylation and the neutralization such that the intermediate alkylation product is already the free amine. To proceed to the quaternary salt with epoxides it is generally necessary to provide an equivalent of an acid to provide a proton for the hydroxy group and a counter anion for the salt In one embodiment the quaternizing agent may be derived from dialkyl sulphates such as dimethyl sulphate, N-oxides, sultones such as propane and butane sultone; alkyl, acyl or aralkyl halides such as methyl and ethyl chloride, bromide or iodide or benzyl chloride, and a hydrocarbyl (or alkyl) substituted carbonates. If the acyl halide is benzyl chloride, the aromatic ring is optionally further substituted with alkyl or alkenyl groups.

The hydrocarbyl (or alkyl) groups of the hydrocarbyl substituted carbonates may contain 1 to 50, 1 to 20, 1 to 10 or 1 to 5 carbon atoms per group. In one embodiment the hydrocarbyl substituted carbonates contain two hydrocarbyl groups that may be the same or different. Examples of suitable hydrocarbyl substituted carbonates include dimethyl or diethyl carbonate.

In another embodiment the quaternizing agent can be a hydrocarbyl epoxide, as represented by the following formula, and may optionally be used in combination with an acid:

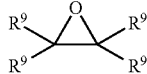
(IX)

wherein each $R^9$ is independently H or a C1-50 hydrocarbyl group. Examples of hydrocarbyl epoxides can include, styrene oxide, ethylene oxide, propylene oxide, butylene oxide, stilbene oxide and C2-50 epoxide.

Suitable acids for use with the quaternizing agents described above, particularly the hydrocarbyl epoxides, are not overly limited. The acid is generally an organic acid and may have the formula R—C(O)OH where R is a hydrocarbyl group. Examples of suitable acids include formic acid, acetic acid, propionic acid, butyric acid, pentanoic acid and combinations thereof.

The quaternary salt is generally present in the fuel composition at a level of 50 ppm or higher or even 100 ppm or higher. In some embodiments the quaternary salt is present from 0.005 to 5 percent by weight (% wt).

The quaternary salts of the invention may also comprise a polyester quaternary ammonium salt which may be derived from the reaction of a polyester that contains a tertiary amino group and a quaternizing agent suitable for converting the tertiary amino group to a quaternary nitrogen.

The polyester containing a tertiary amino group used in the preparation of the additives of the invention may also be described as a non-quaternized polyester containing a tertiary amino group.

In some embodiments the polyester is the reaction product of a fatty carboxylic acid containing at least one hydroxyl group and a compound having an oxygen or nitrogen atom capable of condensing with said acid and further having a tertiary amino group. Suitable fatty carboxylic acids that may used in the preparation of the polyesters described above may be represented by the formula:

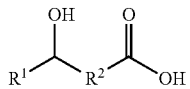
(X)

where $R^1$ is a hydrogen or a hydrocarbyl group containing from 1 to 20 carbon atoms and $R^2$ is a hydrocarbylene group containing from 1 to 20 carbon atoms. In some embodiments $R^1$ contains from 1 to 12, 2 to 10, 4 to 8 or even 6 carbon atoms, and $R^2$ contains from 2 to 16, 6 to 14, 8 to 12, or even 10 carbon atoms.

In some embodiments the fatty carboxylic acid used in the preparation of the polyester is 12-hydroxystearic acid, ricinoleic acid, 12-hydroxy dodecanoic acid, 5-hydroxy dodecanoic acid, 5-hydroxy decanoic acid, 4-hydroxy decanoic acid, 10-hydroxy undecanoic acid, or combinations thereof.

The compound having an oxygen or nitrogen atom capable of condensing with said acid and further having a tertiary amino group may include any of the materials described above as compounds having an oxygen or nitrogen atom capable of condensing with the acylating agent. Suitable materials may be represented by the formula:

(XI)

where $R^3$ is a hydrocarbyl group containing from 1 to 10 carbon atoms; $R^4$ is a hydrocarbyl group containing from 1 to 10 carbon atoms; $R^5$ is a hydrocarbylene group containing from 1 to 20 carbon atoms; and $X^1$ is O or $NR^6$ where $R^6$ is a hydrogen or a hydrocarbyl group containing from 1 to 10 carbon atoms. In some embodiments $R^3$ contains from 1 to 6, 1 to 2, or even 1 carbon atom, $R^4$ contains from 1 to 6, 1 to 2, or even 1 carbon atom, $R^5$ contains from 2 to 12, 2 to 8 or even 3 carbon atoms, and $R^6$ contains from 1 to 8, or 1 to 4 carbon atoms. In some of these embodiments, formula (II) becomes:

(XI-a)

(XI-b)

where the various definitions provided above still apply.

Examples of nitrogen or oxygen containing compounds capable of condensing with the polyester agents include all of those listed above as examples of materials that are capable of condensing with the acylating agents.

The quaternized polyester salt can be a quaternized polyester amide salt. In such embodiments the polyester containing a tertiary amino group used to prepare the quaternized polyester salt is a polyester amide containing a tertiary amino group. In some of these embodiments the amine or aminoalcohol is reacted with a monomer and then the resulting material is polymerized with additional monomer, resulting in the desired polyester amide which may then be quaternized.

In some embodiments the quaternized polyester salt includes an anion represented by the following formula:

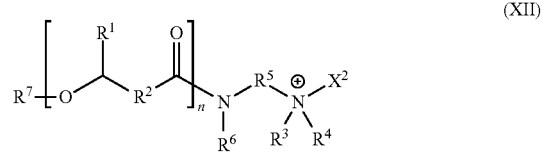
(XII)

where $R^1$ is a hydrogen or a hydrocarbyl group containing from 1 to 20 carbon atoms and $R^2$ is a hydrocarbylene group containing from 1 to 20 carbon atoms; $R^3$ is a hydrocarbyl group containing from 1 to 10 carbon atoms; $R^4$ is a hydrocarbyl group containing from 1 to 10 carbon atoms; $R^5$ is a hydrocarbylene group containing from 1 to 20 carbon atoms; $R^6$ is a hydrogen or a hydrocarbyl group containing from 1 to 10 carbon atoms; n is a number from 1 to 10; $R^7$ is hydrogen, a hydrocarbonyl group containing from 1 to 22 carbon atoms, or a hydrocarbyl group containing from 1 to 22 carbon atoms; and $X^2$ is a group derived from the quaternizing agent. In some embodiments $R^6$ is hydrogen.

As above, in some embodiments $R^7$ contains from 1 to 12, 2 to 10, 4 to 8 or even 6 carbon atoms, and $R^2$ contains from 2 to 16, 6 to 14, 8 to 12, or even 10 carbon atoms, $R^3$ contains from 1 to 6, 1 to 2, or even 1 carbon atom, $R^4$ contains from 1 to 6, 1 to 2, or even 1 carbon atom, $R^5$ contains from 2 to 12, 2 to 8 or even 3 carbon atoms, and $R^6$ contains from 1 to 8, or 1 to 4 carbon atoms. In any of these embodiments n may be from 2 to 9, or 3 to 7, and $R^7$ may contain from 6 to 22, or 8 to 20 carbon atoms.

In these embodiments the quaternized polyester salt is essentially capped with a C1-22, or a C8-20, fatty acid. Examples of suitable acids include oleic acid, palmitic acid, stearic acid, erucic acid, lauric acid, 2-ethylhexanoic acid, 9,11-linoleic acid, 9,12-linoleic acid, 9,12,15-linolenic acid, abietic acid, or combinations thereof.

The number average molecular weight (Mn) of the quaternized polyester salts of the invention may be from 500 to 3000, or from 700 to 2500, The polyester useful in the present invention can be obtained by heating one or more hydroxycarboxylic acids or a mixture of the hydroxycarboxylic acid and a carboxylic acid, optionally in the presence of an esterification catalyst. The hydroxycarboxylic acids can have the formula HO—X—COOH wherein X is a divalent saturated or unsaturated aliphatic radical containing at least 8 carbon atoms and in which there are at least 4 carbon atoms between the hydroxy and carboxylic acid groups, or from a mixture of such a hydroxycarboxylic acid and a carboxylic acid which is free from hydroxy groups. This reaction can be carried out at a temperature in the region of 160 C to 200 C, until the desired molecular weight has been obtained. The course of the esterification can be followed by measuring the acid value of the product, with the desired polyester, in some embodiments, having an acid value in the range of 10 to 100 mg KOH/g or in the range of 20 to 50 mg KOH/g. The indicated acid value range of 10 to 100 mg KOH/g is equivalent to a number average molecular weight range of 5600 to 560. The water formed in the esterification reaction can be removed from the reaction medium, and this can be conveniently done by passing a stream of nitrogen over the reaction mixture or, by carrying out the reaction in the presence of a solvent, such as toluene or xylene, and distilling off the water as it is formed.

The resulting polyester can then be isolated in conventional manner: however, when the reaction is carried out in the presence of an organic solvent whose presence would not be harmful in the subsequent application, the resulting solution of the polyester can be used.

In the said hydroxycarboxylic acids the radical represented by X may contain from 12 to 20 carbon atoms, optionally where there are between 8 and 14 carbon atoms between the carboxylic acid and hydroxy groups. In some embodiments the hydroxy group is a secondary hydroxy group.

Specific examples of such hydroxycarboxylic acids include ricinoleic acid, a mixture of 9- and 10-hydroxystearic acids (obtained by sulphation of oleic acid followed by hydrolysis), and 12-hydroxystearic acid, and especially the commercially available hydrogenated castor oil fatty acid which contains in addition to 12-hydroxystearic acid minor amounts of stearic acid and palmitic acid.

The carboxylic acids which can be used in conjunction with the hydroxycarboxylic acids to obtain these polyesters are preferably carboxylic acids of saturated or unsaturated aliphatic compounds, particularly alkyl and alkenyl carboxylic acids containing a chain of from 8 to 20 carbon atoms. As examples of such acids there may be mentioned lauric acid, palmitic acid, stearic acid and oleic acid.

In one embodiment the polyester is derived from commercial 12-hydroxy-stearic acid having a number average molecular weight of about 1600. Polyesters such as this are described in greater detail in U.K. Patent Specification Nos. 1373660 and 1342746.

In some embodiments the components used to prepare the additives described above are substantially free of, essentially free of, or even completely free of, non-polyester-containing hydrocarbyl substituted acylating agents and/or non-polyester-containing hydrocarbyl substituted diacylating agents, such as for example polyisobutylene. In some embodiments these excluded agents are the reaction product of a long chain hydrocarbon, generally a polyolefin reacted with a monounsaturated carboxylic acid reactant, such as, (i) α,β-monounsaturated $C_4$ to $C_{10}$ dicarboxylic acid, such as, fumaric acid, itaconic acid, maleic acid; (ii) derivatives of (i) such as anhydrides or $C_1$ to $C_5$ alcohol derived mono- or di-esters of (i); (iii) α,β-monounsaturated $C_3$ to $C_{10}$ monocarboxylic acid such as acrylic acid and methacrylic acid; or (iv) derivatives of (iii), such as, $C_1$ to $C_5$ alcohol derived esters of (iii) with any compound containing an olefinic bond represented by the general formula $(R^9)(R^{10})C=C(R^{11})(CH(R^7)(R^8))$ wherein each of $R^9$ and $R^{10}$ is independently hydrogen or a hydrocarbon based group; each of $R^{11}$, $R^7$ and $R^8$ is independently hydrogen or a hydrocarbon based group and preferably at least one is a hydrocarbyl group containing at least 20 carbon atoms. In one embodiment, the excluded hydrocarbyl-substituted acylating agent is a dicarboxylic acylating agent. In some of these embodiments, the excluded hydrocarbyl-substituted acylating agent is polyisobutylene succinic anhydride.

By substantially free of, it is meant that the components of the present invention are primarily composed of materials other than hydrocarbyl substituted acylating agents described above such that these agents are not significantly involved in the reaction and the compositions of the invention do not contain significant amounts of additives derived from such agents. In some embodiments the components of the invention, or the compositions of the invention, may contain less than 10 percent by weight of these agents, or of the additives derived from these agents. In other embodiments the maximum allowable amount may be 5, 3, 2, 1 or even 0.5 or 0.1 percent by weight. One of the purposes of these embodiments is to allow the exclusion of agents such as polyisobutylene succinic anhydrides from the reactions of the invention and so, to also allow the exclusion of quaternized salt detergent additive derived from agents such as polyisobutylene succinic anhydrides. The focus of this invention is on polyester, or hyperdispersant, quaternary salt detergent additives.

The quaternizing agents useful in preparing the quaternized polyester salts described above include any of the quaternizing agents described above with regards to the other quaternized salts. In one embodiment, the quaternizing agent can be a hydrocarbyl epoxide in combination with an acid. Examples of hydrocarbyl epoxides include: ethylene oxide, propylene oxide, butylene oxide, styrene oxide and combinations thereof. In one embodiment the quaternizing agent does not contain any styrene oxide.

In some embodiments the acid used with the hydrocarbyl epoxide may be a separate component, such as acetic acid. In other embodiments, for example when the hydrocarbyl acylating agent is a dicarboxylic acylating agent, no separate acid component is needed. In such embodiments, the detergent may be prepared by combining reactants which are essentially free of, or even free of, a separate acid component, such as acetic acid, and rely on the acid group of the hydrocarbyl acylating agent instead. In other embodiments, a small amount of an acid component may be present, but at <0.2 or even <0.1 moles of acid per mole of hydrocarbyl acylating agent.

In some embodiments the quaternizing agent of the invention does not contain any substituent group that contains more than 20 carbon atoms. In other words, in some embodiments the long substituent group that allows for the resulting additive to be organic soluble and thus useful for the purposes of this invention is not provided by the quaternizing agent but instead is brought to the additive by the non-quaternized detergents described above.

In certain embodiments the molar ratio of detergent having an amine functionality to quaternizing agent is 1:0.1 to 2, or 1:1 to 1.5, or 1:1 to 1.3.

Additional Additives

The fuel compositions described above my optionally comprise one or more additional performance additives. These performance additives include metal deactivators, detergents, dispersants, viscosity modifiers, friction modifiers, dispersant viscosity modifiers, extreme pressure agents, antiwear agents, antioxidants, corrosion inhibitors, foam inhibitors, demulsifiers, pour point depressants, seal swelling agents, wax control polymers, scale inhibitors, gas-hydrate inhibitors and mixtures thereof.

The total combined amount of the additional performance additive compounds present on an oil free basis ranges from 0 or 0.001 to 25% wt or from 0.01 to 20% wt of the composition. Although one or more of the other performance additives may be present, it is common for the other performance additives to be present in different amounts relative to each other. Each individual performance additive may be present from 0 or 0.001 to 25 or 20%wt or from 0.001 to 10 or 5% wt of the composition.

Antioxidants include molybdenum dithiocarbamates, sulphurised olefins, hindered phenols, diphenylamines; detergents include neutral or overbased, Newtonian or non-Newtonian, basic salts of alkali, alkaline earth and transition metals with one or more of phenates, sulphurised phenates, sulphonates, carboxylic acids, phosphorus acids, mono- and/or di-thiophosphoric acids, saligenins, an alkylsalicylates, salixarates, Dispersants include N-substituted long chain alkenyl succinimide as well as posted treated version thereof, post-treated dispersants include those by reaction with urea, thiourea, dimercaptothiadiazoles, carbon disulphide, aldehydes, ketones, carboxylic acids, hydrocarbon-substituted succinic anhydrides, nitriles, epoxides, boron compounds, and phosphorus compounds.

Antiwear agents include compounds such as metal thiophosphates, especially zinc dialkyldithiophosphates; phosphoric acid esters or salt thereof; phosphites; and phosphorus-containing carboxylic esters, ethers, and amides. Antiscuffing agents including organic sulphides and polysulphides, such as benzyldisulphide, bis-(chlorobenzyl)disulphide, dibutyl tetrasulphide, di-tertiary butyl polysulphide, di-tert-butylsulphide, sulphurised Diels-Aider adducts or alkyl sulphenyl N'N-dialkyl dithiocarbamates. Extreme Pressure (EP) agents including chlorinated wax, organic sulphides and polysulphides, such as benzyldisulphide, bis--(chlorobenzyl) disulphide, dibutyl tetrasulphide, sulphurised methyl ester of oleic acid, sulphurised alkylphenol, sulphurised dipentene, sulphurised terpene, and sulphurised Diels-Alder adducts; phosphosulphurised hydrocarbons, metal thiocarbamates, such as zinc dioctyldithiocarbamate and barium heptylphenol diacid.

Friction modifiers include fatty amities, esters such as borated glycerol esters, partial esters of glycerol such as glycerol monooleate, fatty phosphites, fatty acid amides, fatty epoxides, borated fatty epoxides, alkoxylated fatty amines, borated alkoxylated fatty amines, metal salts of fatty acids, fatty imidazolines, condensation products of carboxylic acids and polyalkylene-polyamines, amine salts of alkylphosphoric acids. Viscosity modifiers include hydrogenated copolymers of styrene-butadiene, ethylene-propylene polymers, polyisobutenes, hydrogenated styrene-isoprene polymers, hydrogenated isoprene polymers, polymethacrylate esters, polyacrylate esters, poly(alkylstyrenes), alkenyl aryl conjugated diene copolymers, polyolefins, polyalkylmethacrylates and esters of maleic anhydride-styrene copolymers. Dispersant viscosity modifiers (often referred to as DVM) include functionalised polyolefins, for example, ethylene-propylene copolymers that have been functionalised with the reaction product of maleic anhydride and an amine, a polymethacrylate functionalised with an amine, or styrene-maleic anhydride copolymers reacted with an amine.

Corrosion inhibitors include octylamine octanoate, condensation products of dodecenyl succinic acid or anhydride and a fatty acid such as oleic acid with a polyamine.

Metal deactivators include derivatives of benzotriazoles, 1,2,4-triazoles, benzimidazoles, 2-alkyldithiobenzimidazoles or 2-alkyldithiobenzothiazoles.

Foam inhibitors include copolymers of ethyl acrylate and 2-ethylhexyl acrylate and optionally vinyl acetate, Demulsifiers include polyethylene glycols, polyethylene oxides, polypropylene oxides and (ethylene oxide-propylene oxide)polymers; pour point depressants including esters of maleic anhydride-styrene copolymers, polymethacrylates, polyacrylates or polyacrylamides.

Seal swell agents include Exxon Necton37™ (FN 1380) and Exxon Mineral Seal Oil.

The compositions of the present invention may also include a hydrocarbon substituted with at least two carboxy functionalities in the form of acids or at least one carboxy functionality in the form an anhydride. In some embodiments the additive is a hydrocarbon substituted with at least two carboxy functionalities in the form of acids or anhydrides. In other embodiments the additive is a hydrocarbyl-substituted succinic acylating agent. In other embodiments the substituted hydrocarbon additive is a dimer acid compound. In still other embodiments the substituted hydrocarbon additive of the present invention includes a combination of two or more of the additives described in this section.

The substituted hydrocarbon additives include succinic acids, halides, anhydrides and combination thereof. In some embodiments the agents are acids or anhydrides, and in other embodiments the agents are anhydrides, and in still other embodiments the agents are hydrolyzed anhydrides. The hydrocarbon of the substituted hydrocarbon additive and/or the primary hydrocarbyl group of the hydrocarbyl-substituted succinic acylating agent generally contains an average of at least about 8, or about 30, or about 35 up to about 350, or to about 200, or to about 100 carbon atoms. In one embodiment, the hydrocarbyl group is derived from polyisobutylene. The polyisobutylene can have a number average molecular weight (Mn) from 300 to 5000 and in other embodiments from 500 or 900 up to 2000 or 1500.

The substituted hydrocarbon additives can be prepared by reacting a hydrocarbon, such as polyisobutylene, with an excess of maleic anhydride to provide substituted succinic acylating agents wherein the number of succinic groups for each equivalent weight of substituent group is at least 1.3, or to about 1.5, or to about 1.7, or to about 1.8. The maximum number generally will not exceed 4.5, or to about 2.5, or to about 2.1, or to about 2.0.

In some embodiments the substituted hydrocarbon additives and/or hydrocarbyl substituted succinic acylating agents suitable for use in the present invention contain di-acid functionality. In other embodiments, which may be used alone or in combination with the embodiments described above, the hydrocarbyl group of the hydrocarbyl substituted succinic acylating agent is derived from polyisobutylene and the di-acid functionality of the agent is provided by a carboxylic acid group, for example a hydrocarbyl substituted succinic acid. In some embodiments the hydrocarbyl substituted acylating agent comprises one or more hydrocarbyl substituted succinic anhydride groups. In some embodiments the hydrocarbyl substituted acylating agent comprises one or more hydrolyzed hydrocarbyl substituted succinic anhydride groups.

Methods of the Invention

In one embodiment the invention is useful as a liquid fuel for an internal combustion engine. The internal combustion engine includes spark ignition and compression ignition engines; 2-stroke or 4-stroke cycles; liquid fuel supplied via direct injection, indirect injection, port injection and carburetor; common rail and unit injector systems; light (e.g. passenger car) and heavy duty (e.g. commercial truck) diesel engines; and engines fuelled with hydrocarbon and non-hydrocarbon fuels and mixtures thereof. The engines may be part of integrated emissions systems incorporating such elements as EGR systems; aftertreatment including three-way catalyst, oxidation catalyst, NOx absorbers and catalysts, catalyzed and non-catalyzed particulate traps optionally employing fuel-borne catalyst; variable valve timing; and injection timing and rate shaping.

In some embodiments the engine of the present invention is a direct injection diesel engine. In other embodiments the engine is a high pressure direct injections engine and in still other embodiments the engine is a direct injection diesel common rail engine.

The fuel compositions described above may be supplied to an engine, resulting in a power gain in the output of the engine. This resulting power gain is generally relative to the engine operating under similar if not identical conditions and being supplied an identical fuel composition except that the quaternary ammonium salt additive is not present in the fuel. The term high pressure as used herein with regards to the engine refers to the fuel injector pressure of the engine. In some embodiments a high pressure engine means the fuel injectors operate at pressures of 20 M Pa or higher, 30 MPa and higher, 34 MPa and higher, 40 MPa or higher, or even 50 MPa and higher, wherein these minimum pressure values may with regards to idle pressure or maximum pressure.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring); substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy); hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

All percent values, part by weight values and similar figures provided above are on a weight basis unless otherwise noted. The end points of the various ranges provided above may be combined with one another and applied to any of the other components described above.

It is known that some of the materials described above may interact with one another when present in a composition, so that the components of the composition may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

SPECIFIC EMBODIMENT

The invention will be further illustrated by the following examples, which sets forth particularly advantageous embodiments. While the examples are provided to illustrate the invention, they are not intended to limit it.

EXAMPLE SET 1

A set of examples is prepared and tested in the CEC DW10 diesel fuel injector fouling test, designated SG-F-098. The test uses a 2.0 L, 4-cylinder Peugeot DW10 direct injection turbocharged, common rail engine. A standard test procedure is followed except that each sample is run for four one hour test cycles, and then four one hour test cycles are completed with the baseline fuel. The results are then compared to show the power gain, if any, the example gives over the baseline (non-additized) fuel. The power output of the engine (measured in kW) is measured each test cycle completed.

All of the examples are prepared in the same sulfur free diesel fuel and each additive tested is added to the fuel at a level of 500 ppm. The additive tested in each example and the power output results are summarized in the table below.

TABLE 1

Example Set 1, DW10 Results

| Example | Additive | Treat Rate | Baseline Power Output[1] | Example Power Output[2] | Power Gain[3] |
|---|---|---|---|---|---|
| 1-A | Polyisobutylene (PIB)[4] | 500 ppm | 98.8 | 98.9 | 0.1% |
| 1-B | PIB, polyalkylene polyamine based dispersant | 500 ppm | 98.9 | 99.0 | 0.1% |

TABLE 1-continued

Example Set 1, DW10 Results

| Example | Additive | Treat Rate | Baseline Power Output[1] | Example Power Output[2] | Power Gain[3] |
|---------|----------|------------|--------------------------|-------------------------|---------------|
| 1-C | PIB, diamine-based dispersant | 500 ppm | 99.0 | 98.9 | −0.1% |
| 1-D | PIB-based hydrolyzed succinic anhydride | 500 ppm | 99.1 | 99.0 | −0.1% |
| 1-E | PIB-based quaternary ammonium salt made with the use of an alkyl epoxide. | 500 ppm | 98.5 | 99.7 | 1.2% |
| 1-F | PIB-based quaternary ammonium salt made with the use of a dialkyl sulphate. | 500 ppm | 98.7 | 99.9 | 1.2% |
| 1-G | The Additive of Example 1-G The Additive of Example 1-E | 500 ppm 500 ppm | 98.5 | 99.6 | 1.1% |

[1]The Baseline Power Output values are the power outputs, in kW, measured when the test engine is running on non-additized base fuel. The reported values are averages of results obtained from each of the four one hour cycles completed. A set of baseline fuel samples is run with every example in order to account for any drift in the engine power output over the testing.
[2]The Example Power Output values are the power outputs, in Kw, measured when the test engine is running on the additized Example fuel. The reported values are averages of results obtained from each of the four one hour cycles completed.
[3]The Power Gain values are the % power gain the Example fuel provides over the non-additized base-line fuel. A negative percent indicates a power loss compared to the base line fuel.
[4]The polyisobutylene of Example 1-B is comparable to the polyisobutylene used in the preparation of all of the PIB-based additives in the example set.

The results show that. Examples 1-E, 1-F and 1-G each provide a significant power gain compared to the baseline fuel results while Examples 1-A, 1-B, 1-C and 1-D each show a slight power gain or even a slight power loss. These results demonstrate that the methods and compositions of the present invention allow for an unexpected power gain in the operation of an engine compared to other additives that may otherwise be used.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, all percent values listed herein are on a weight basis. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

In addition, all the embodiments described above have been contemplated as to their use, both alone and in combination, with all of the other embodiments described above, and these combinations are considered to be part of the invention. The specific embodiments of amines and alcohols described above have been contemplated in combination with the specific embodiments of the carboxylic acids useful in the invention.

What is claimed is:

1. A method of providing a gain in power during the operation of an internal combustion engine comprising:
   A. supplying to said engine a fuel composition comprising:
      i. a fuel which is liquid at room temperature; and
      ii. higher than 50 ppm of a quaternary ammonium salt comprising the reaction product of:
         (a) the reaction product of a hydrocarbyl substituted acylating agent and a compound having an oxygen or nitrogen atom capable of condensing with said acylating agent and further having a tertiary amino group; and
         (b) a quaternizing agent suitable for converting the tertiary amino group to a quaternary nitrogen,
      wherein the engine receives a power gain as compared to the engine's operation with the fuel of component (i) without the additive of component (ii).

2. The method of claim 1 wherein the quaternizing agent is selected from the group consisting of dialkyl sulfates, benzyl halides, hydrocarbyl substituted carbonates, hydrocarbyl epoxides optionally in combination with an acid or mixtures thereof.

3. The method of claim 1 wherein the quaternizing agent is selected from the group consisting of dialkyl sulfates, hydrocarbyl substituted carbonates, hydrocarbyl epoxides optionally in combination with an acid or mixtures thereof.

4. The method of claim 1 wherein the hydrocarbyl-substituted acylating agent is polyisobutylene succinic anhydride.

5. The method of claim 1 wherein compound (a) is derived from N,N-dimethyl-1,3-diaminopropane.

6. The method of claim 1 wherein the fuel is diesel fuel containing 500 ppm of sulfur or less, a biodiesel fuel, or a combination thereof.

7. The method of claim 1 wherein the engine receives a power gain of at least 0.5 kW, measured at maximum engine power, compared to the engine's operation with the fuel of component (i) without the additive of component (ii).

8. The method of claim 1 wherein the hydrocarbyl substituted acylating agent comprises polyisobutylene succinic anhydride and the quaternizing agent comprises at least one dialkyl sulphate, hydrocarbyl substituted carbonate, hydrocarbyl epoxide, optionally in combination with an acid, or mixtures thereof.

9. The method of claim 8 wherein the quaternizing agent comprises at least one of dimethyl sulphate, styrene oxide, ethylene oxide, propylene oxide, butylene oxide, stilbene oxide, C2-C50 oxide, or mixtures thereof.

10. A method of providing a gain in power during the operation of an internal combustion engine comprising:
   A. supplying to said engine a fuel composition comprising:
      i. a fuel which is liquid at room temperature; and ii. higher than 50 ppm of a quaternary ammonium salt comprising the reaction product of:
(a) a compound containing a tertiary amino group; and
(b) a quaternizing agent suitable for converting the tertiary amino group to a quaternary nitrogen, wherein the engine receives a power gain as compared to the engine's operation with the fuel of component (i) without the additive of component (ii).

11. The method of claim 10 wherein the compound containing a tertiary amino group comprises:
(i) the reaction product of a hydrocarbyl substituted acylating agent and a compound having an oxygen or nitrogen atom capable of condensing with said acylating agent and further having a tertiary amino group; or
(ii) a polyester reaction product of a fatty carboxylic acid containing at least one hydroxyl group and a compound having an oxygen or nitrogen atom capable of condensing with said acid and further having a tertiary amino group.

12. A method of providing a gain in power during the operation of an internal combustion engine comprising:
A. supplying to said engine a fuel composition comprising:
i. a fuel which is liquid at room temperature; and
ii. higher than 50 ppm of a quaternary ammonium salt comprising the reaction product of:
(a) the reaction product of a hydrocarbyl substituted acylating agent and a compound having an oxygen or nitrogen atom capable of condensing with said acylating agent and further having a tertiary amino group; and
(b) a quaternizing agent suitable for converting the tertiary amino group to a quaternary nitrogen, wherein the engine receives a power gain of at least 0.5 kW, measured at maximum engine power.

* * * * *